(12) United States Patent
Sasaki (10) Patent No.: US 8,520,130 B2
(45) Date of Patent: Aug. 27, 2013

(54) IMAGE CAPTURING APPARATUS AND AUTO-FOCUS CONTROL METHOD THEREOF

(75) Inventor: Futoshi Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 13/196,369

(22) Filed: Aug. 2, 2011

(65) Prior Publication Data

US 2012/0044408 A1  Feb. 23, 2012

(30) Foreign Application Priority Data

Aug. 20, 2010  (JP) .................................. 2010-185578

(51) Int. Cl.
*H04N 5/232* (2006.01)
*G03B 13/00* (2006.01)

(52) U.S. Cl.
USPC ............................................ 348/345; 396/80

(58) Field of Classification Search
USPC ................. 348/345–356; 396/79–82, 89, 93, 396/102–104, 121–124, 130
See application file for complete search history.

(56) References Cited

U.S. PATENT DOCUMENTS

| 7,733,412 | B2* | 6/2010 | Takayama | 348/349 |
| 7,860,386 | B2* | 12/2010 | Terashima | 396/104 |
| 2008/0050108 | A1* | 2/2008 | Mizutani et al. | 396/104 |
| 2008/0252773 | A1* | 10/2008 | Oishi | 348/347 |

FOREIGN PATENT DOCUMENTS

| JP | 06-303491 | 10/1994 |
| JP | 2003-075717 | 3/2003 |
| JP | 2004-317699 | 11/2004 |
| JP | 2008-167295 | 7/2008 |

* cited by examiner

*Primary Examiner* — Nelson D. Hernández Hernández
(74) *Attorney, Agent, or Firm* — Cowan, Liebowitz & Latman, P.C.

(57) ABSTRACT

An image capturing apparatus senses a subject by an image sensor to acquire image data, detects a face from the image data, estimates a distance from the image sensor to the detected face in a real space, obtains first and second depths of field based on a focal length, an f-number, and the estimated distance/a distance in the real space to an in-focus point when acquiring the image data used to detect the face, calculates a first and second scan ranges based on the first/second depths of field and the estimated distance/the distance to the in-focus point, detects the in-focus point based on a contrast signal acquired while driving the focus lens in the first or second scan range selected by a selection unit, which selects the first scan range if at least part of the first and second scan ranges overlaps, otherwise does not select the first scan range.

6 Claims, 9 Drawing Sheets

IMAGE CAPTURING APPARATUS AND AUTO-FOCUS CONTROL METHOD THEREOF

BACKGROUND OF THE INVENTION

1. Field of the Invention

The present invention relates to an image capturing apparatus and a control method thereof, and more particularly, to an image capturing apparatus with an auto-focus function and a control method thereof.

2. Description of the Related Art

Conventionally, an image capturing apparatus that uses an imaging element, such as a CCD or CMOS image sensor, and that has an auto-focus (AF) function is known. One of the AF systems performed in the image capturing apparatus is a contrast method. In AF of the contrast method, an HPF (high-pass filter) extracts a signal, which indicates the contrast, from an electrical signal obtained by photoelectrically converting subject light entered into the imaging element through a focus lens and amplifies the signal. The waveform of the amplified contrast signal is analyzed, and auto focus is performed by focusing the subject based on the analysis result.

Specifically, the image capturing apparatus with the auto-focus function performs a focusing operation by using a phenomenon that the waveform of the contrast signal is gentle when the subject is not focused and is sharp when the subject is focused. More specifically, the focus lens is moved in the optical axis direction to search the lens position where the waveform of the contrast signal obtained from the subject image output from the imaging element in accordance with the lens drive is the sharpest. The series of operations for moving the focus lens to search the focus position will be called auto-focus scan.

Meanwhile, Japanese Patent Laid-Open No. 06-303491 discloses an image capturing apparatus with an auto-focus function which detects, for example, a person as a subject, obtains information of the distance to the detected subject, and adjusts the focal length, the focus position, and the aperture of the imaging lens based on the obtained distance so that the subject falls within the depth of field.

Japanese Patent Laid-Open No. 2003-75717 describes a method of calculating the distance to the subject using an image capturing apparatus. The image capturing apparatus includes a distance detection apparatus that detects the distance (subject distance) from the image capturing apparatus to the subject based on the proportion of an image of the captured subject in the display screen.

Japanese Patent Laid-Open No. 2004-317699 proposes a technique for detecting a face from an imaging signal and narrowing the scan range based on the face detection result, the subject distance, and the depth of field information to reduce the time required for the auto-focus scan.

Figure 10A:
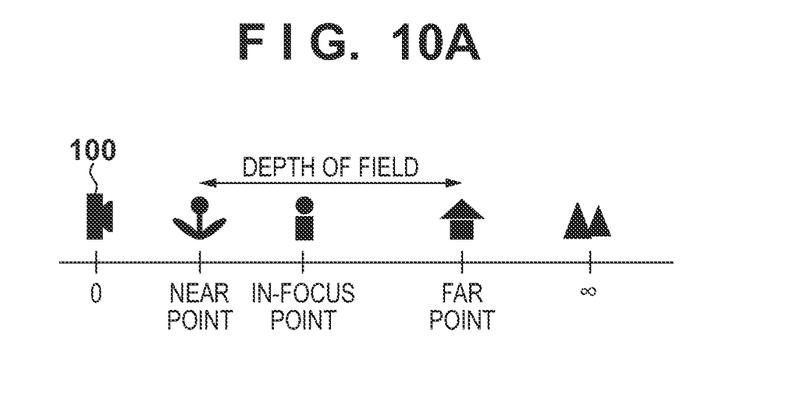
FIGS. 10A and 10B are diagrams for explaining the depth of field.
Figure 10B:
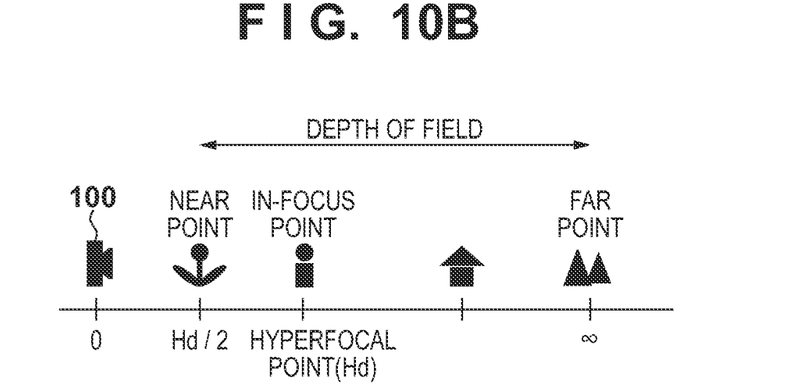

The depth of field denotes a range from the near point to the far point determined based on the following Expressions (1) and (2) using a distance to an in-focus point, a focal length, an acceptable circle of confusion, and an f-number as shown in FIGS. 10A and 10B.

Near point (depth to the near side)=(hyperfocal distance (Hd)×distance to an in-focus point)/(hyperfocal distance (Hd)+distance to an in-focus point)   (1)

Far point (depth to the far side)=(hyperfocal distance (Hd)×distance to an in-focus point)/(hyperfocal distance (Hd)−distance to an in-focus point)   (2)

For example, as shown in FIG. 10B, when the hyperfocal point coincides with the in-focus point, the subject is substantially clear within a range from a midpoint (Hd/2) between an imaging position (0) and a hyperfocal point to infinity. The hyperfocal distance increases with an increase in the lens focal length and increases with an decrease in the f-number. The midpoint (Hd/2) between the imaging position (0) and the hyperfocal point is also a shortest distance point, i.e. a near point, that falls within the depth of field when the hyperfocal point coincides with the in-focus point.

The hyperfocal distance is determined based on the following Expression (3).

Hyperfocal distance=(lens focal length)$^2$/(acceptable circle of confusion×f-number)   (3)

The acceptable circle of confusion denotes a "defocusing tolerance" indicating a lower limit that can be recognized by naked eye in a normal observation.

Japanese Patent Laid-Open No. 2008-167295 discloses a technique for identifying the face of a person as follows. Reliability is calculated from a correlation value between a distance D1 to the subject obtained based on the proportion, in the display screen, of the size of the image of the subject detected from the captured image area and a distance D2 to the subject obtained based on the focal length and the focus position of the imaging lens. The face is identified when the reliability exceeds a predetermined threshold.

However, if the detected subject is the face of a person in a picture, the subject distance may be falsely detected when the distance to the subject is calculated based on the information of the focal length, the size of the display screen, and the size of the detected face as described above. The detected face may not be focused when the auto-focus scan is performed by calculating the auto-focus scan range based on the falsely detected subject distance. Or the auto-focus scan needs to be performed again with an enlarged auto-focus scan range, which causes a problem that it takes a long time until properly focusing on the detected face.

The process of identifying the face of a person based on the method of Japanese Patent Laid-Open No. 2008-167295 is a process executed after the recognition of the focus position of the imaging lens when the subject is focused by the auto focus. Therefore, the process cannot be used to calculate the auto-focus scan range.

In flash imaging, if an amount of flash light is determined in accordance with the falsely detected subject distance, a sufficient amount of light may not be obtained, or the light may be too bright. Therefore, an image with appropriate exposure may not be obtained.

SUMMARY OF THE INVENTION

The present invention has been made in consideration of the above situation, and the time required for auto-focus scan is reduced even if a picture of face is included in a subject when auto focus is performed to focus a face detected by face detection.

According to the present invention, provided is an image capturing apparatus that performs auto-focus control of a contrast method based on image data obtained by photoelectrically converting light from a subject entered through an imaging lens, the image capturing apparatus comprising: an image sensor that senses a subject at a predetermined period to acquire image data; a face detection unit that detects a face of a person from the image data when images based on the image data acquired by the image sensor are sequentially displayed on a display unit; an estimation unit that estimates a distance from the image sensor to the detected face in a real space; a calculation unit that obtains a first depth of field based on a focal length of the imaging lens, an f-number, and the distance estimated by the estimation unit, calculates a first scan range for driving a focus lens of the imaging lens in the auto-focus control based on the first depth of field and the distance, obtains a second depth of field based on the focal length, the f-number, and a distance in the real space to an in-focus point when the image data used to detect the face is acquired, and calculates a second scan range based on the second depth of field and the distance to the in-focus point; a selection unit that selects one of the first and second scan ranges calculated by the calculation unit; and a detection unit that detects the in-focus point based on a contrast signal acquired while driving the focus lens in the first or second scan range selected by the selection unit, wherein the selection unit selects the first scan range if at least part of the first and second scan ranges overlaps and does not select the first scan range if the first and second scan ranges do not overlap.

According to the present invention, provided is a control method of an image capturing apparatus that performs auto-focus control of a contrast method based on image data obtained by photoelectrically converting light from a subject entered through an imaging lens, the control method comprising: an image sensing step of sensing a subject by an image sensor at a predetermined period to acquire image data; a face detection step of detecting a face of a person from the image data when images based on the image data acquired in the image sensing step are sequentially displayed on a display unit; an estimation step of estimating a distance from the image sensor to the detected face in a real space; a calculation step of obtaining a first depth of field based on a focal length of the imaging lens, an f-number, and the distance estimated in the estimation step, calculating a first scan range for driving a focus lens of the imaging lens in the auto-focus control based on the first depth of field and the distance, obtaining a second depth of field based on the focal length, the f-number, and a distance in the real space to an in-focus point when the image data used to detect the face is acquired, and calculating a second scan range based on the second depth of field and the distance to the in-focus point; a selection step of selecting one of the first and second scan ranges calculated in the calculation step; and a detection step of detecting the in-focus point based on a contrast signal acquired while driving the focus lens in the first or second scan range selected in the selection step, wherein in the selection step, the first scan range is selected if at least part of the first and second scan ranges overlaps, and the first scan range is not selected if the first and second scan ranges do not overlap.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

<Configuration of Image Capturing Apparatus>

Figure 1:
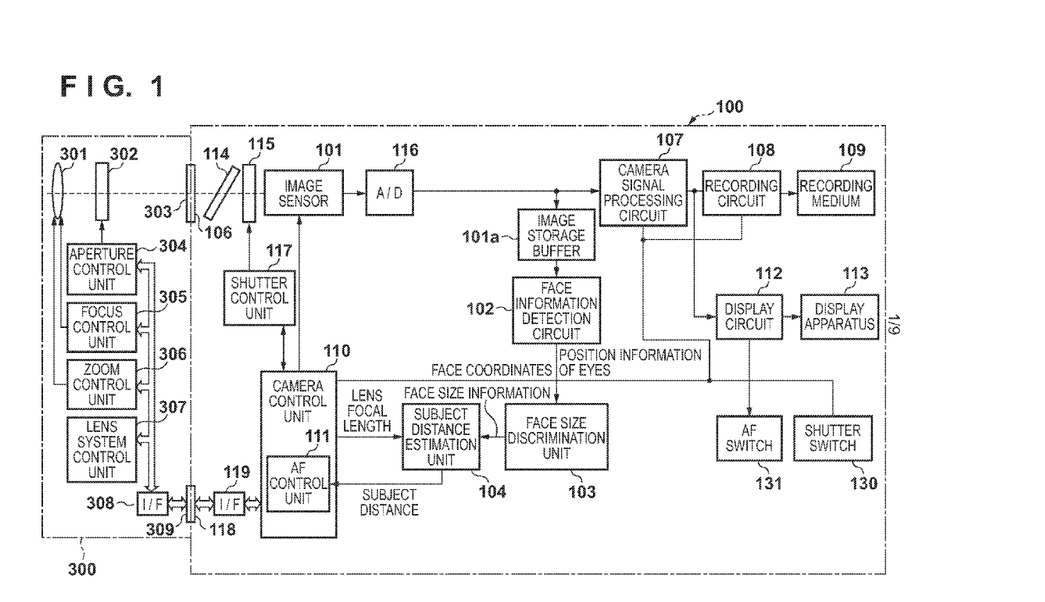
FIG. 1 is a block diagram showing a configuration of an example of an image capturing apparatus according to an embodiment of the present invention.

FIG. 1 is a block diagram showing a configuration of an image capturing apparatus according to an embodiment of the present invention. A lens unit 300 is mounted on a camera body 100 in the image capturing apparatus illustrated in FIG. 1 to capture an image.

The light from a subject enters the camera body 100 from the lens unit 300 constituting an imaging optical system. The light is irradiated on an image sensor 101 including a photo-electric conversion element, such as a CCD or CMOS image sensor, through a mirror 114 and a shutter 115. The image sensor 101 photoelectrically converts the irradiated light into an electrical signal and further executes predetermined processing, such as gain adjustment and noise removal, to output an analog image signal. An A/D converter 116 converts the analog image signal output from the image sensor 101 into a digital signal to form image data. An image storage buffer 101a temporarily stores the image data output from the A/D converter 116.

The image data based on the image signal output at a predetermined period from the image sensor 101 can be sequentially displayed on a display apparatus 113 arranged on the camera body 100 to realize a live view.

A face information detection circuit 102 acquires the image data from the image storage buffer 101a and detects information of the face of the subject (such as position information of eyes and face coordinates) from the acquired image data. A face size discrimination unit 103 discriminates the size of the detected face based on the information of the face of the subject detected by the face information detection circuit 102. The discriminated face size is output as face size information.

A camera control unit 110 includes, for example, a microprocessor, a RAM, and a ROM, and the microprocessor operates in accordance with programs and data stored in advance in the ROM, while the RAM serves as a work memory. The microprocessor controls the entire operation of the camera body 100. The camera control unit 110 performs auto-focus control based on an AF evaluation value supplied from a camera signal processing circuit 107 described below. In addition, the camera control unit 110 communicates with the lens unit 300 through an interface 119 described below to acquire a focal length, a focus lens position, and an f-number of the lens unit 300. A subject distance estimation unit 104 estimates a distance (subject distance) in a real space from the image sensor 101 to the subject based on the size of the face discriminated by the face size discrimination unit 103, the size of the image sensor 101, and the focal length of the lens unit 300.

The camera control unit 110 calculates a depth of field based on the focal length, the focus lens position, and the f-number acquired from the lens unit 300. The camera control unit 110 also calculates a depth of field around the detected face by using the subject distance estimated by the subject distance estimation unit 104 instead of the focus lens position.

The camera control unit 110 further includes an AF (auto focus) control unit 111 that determines a range of driving the focus lens as described below and controls an auto focusing operation. The AF control unit 111 according to the present embodiment performs auto-focus control (AF control) of a so-called contrast method. The range of driving the focus lens will be hereinafter called an "auto-focus scan range". The AF control unit 111 may be a program operated on the microprocessor included in the camera control unit 110 or may be independently configured as dedicated hardware.

If a face detection possible range is set as the auto-focus range, an unnecessary part does not have to be scanned, and fast focusing is possible. A process that prevents the recognition rate from dropping relative to certain defocusing is applied in the face detection. The face detection possible range can be calculated by multiplying the "acceptable circle of confusion" by a coefficient according to a face detection capability constant and an image reduction ratio, and a depth of field within which a face detection is possible can be expressed by the following Expressions (4) and (5)

Hyperfocal distance for face=(lens focal length)$^2$/(acceptable circle of confusion×face detection acceptable coefficient×image scaling coefficient× f-number)   (4)

Closest end of depth of field for face detection=distance to subject×(hyperfocal distance for face−focal length)/(hyperfocal distance for face+distance to subject−2×focal length)

Furthest end of depth of field for face detection=distance to subject×(hyperfocal distance for face−focal length)/(hyperfocal distance for face−distance to subject)   (5)

The face detection possible range determined based on the depth of field calculated by the above formulas is set as the auto-focus range.

The AF control unit 111 performs the auto-focus control triggered by, for example, an operation to an AF switch 131. For example, the AF control unit 111 communicates with the lens unit 300 described later through the interface 119 when the AF switch 131 is operated and issues a command to a lens system control unit 307 to drive the focus lens.

A shutter switch 130 and the AF switch 131 may be constituted by one button operated cooperatively. For example, the button may be configured to activate the AF switch 131 in a half-press state and activate the shutter switch 130 in a full-press state.

The camera control unit 110 issues a command to the shutter control unit 117 to control the operation of the shutter 115 in accordance with the operation to the shutter switch 130. The shutter control unit 117 controls the operation of the shutter 115 according to the command. The control of the shutter 115 by the shutter control unit 117 is performed in conjunction with an aperture control unit 304 in the lens unit 300 described later.

In addition, the camera control unit 110 includes an exposure (AE) control unit (not shown), etc., and performs exposure control in addition to the auto-focus control to control the entire camera body 100 for photographing operation. The exposure control by the exposure control unit is not closely related to the scope of the present invention and will not be described.

The camera signal processing circuit 107 applies predetermined signal processing, such as γ correction and white balance adjustment, to the image data output from the A/D converter 116. The camera signal processing circuit 107 also executes a process of extracting a contrast signal by applying high-pass filter processing to the image data output from the A/D converter 116, analyzes the extracted contrast signal, and generates an AF evaluation value which is an evaluation value in the auto-focus control of the contrast method. The generated AF evaluation value is supplied to the camera control unit 110 and used to determine the focus in the auto-focus control.

The camera signal processing circuit 107 can also execute a compressed encoding process, etc., of image data. A recording circuit 108 can record, in a recording medium 109, compressed or uncompressed image data output from the camera signal processing circuit 107. The recording medium 109 is formed by, for example, a nonvolatile memory and can be attached and removed from the camera body 100. A display circuit 112 displays the image data output from the camera signal processing circuit 107 on the display apparatus 113 using an LCD, etc., as a display device.

Meanwhile, in the lens unit 300, the light from the subject enters an imaging lens 301 including a zoom lens and a focus lens of the lens unit 300. The entered light is guided through an aperture 302, lens mounts 303 and 106, the mirror 114, and the shutter 115 and is incident on the image sensor 101 as an optical image.

A focus control unit 305 controls focusing operation of the imaging lens 301 based on a control signal from the camera control unit 110. A zoom control unit 306 controls zooming of the imaging lens 301. The aperture control unit 304 controls the aperture 302 based on a control signal or photometric information from the camera control unit 110.

The lens system control unit 307 controls the entire lens unit 300 and includes a memory that temporarily stores a constant, a variable, a program, etc. for operation. The lens system control unit 307 further includes a nonvolatile memory that holds identification information such as a number specific to the lens unit 300, management information, functional information, such as a low f-number, a high f-number, and a focal length, current or past set values, etc.

An interface 308 is for data communication with the camera body 100. The interface 308 is electrically connected to the interface 119 of the camera body 100 through connectors 309 and 118.

<About Face Detection>

Face detection in the present embodiment will be described. In the present embodiments, the face information detection circuit 102 executes a pattern recognition process to detect information of the face from the image data. The pattern recognition process will be described with reference to a flow chart of FIG. 2 and FIG. 3. The pattern recognition is a process of matching an extracted pattern with one of the predetermined concepts (classes). Template matching is a method of comparing an image and a template, which denotes a pattern, while moving the template over the image. The methods can be used for, for example, position detection of a target object, tracing of a moving object, and positioning of images with different imaging periods. Particularly, the methods are useful for detecting information of the face, such as extracting physical shapes of eyes and nose from an image area.

Figure 2:
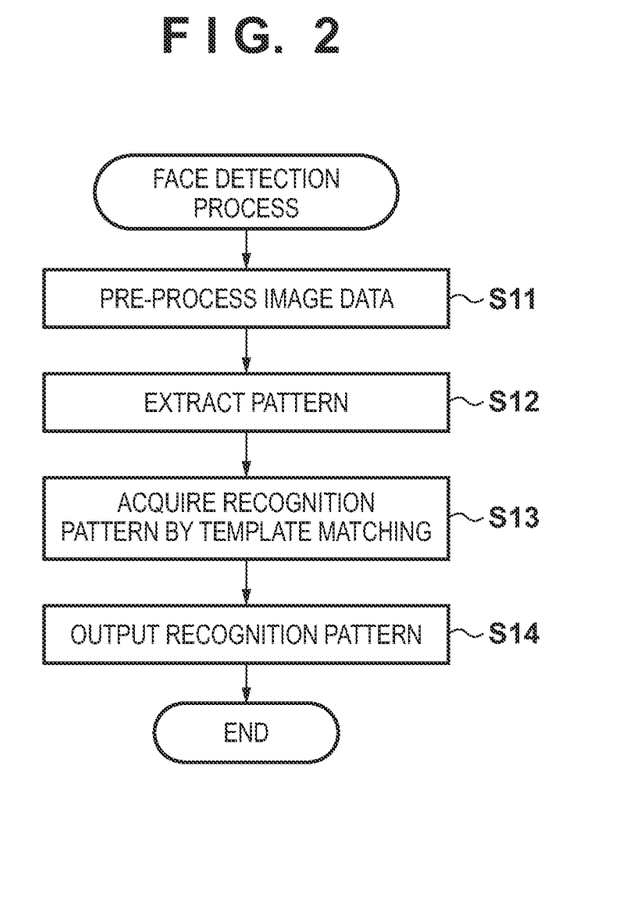
FIG. 2 is a flow chart showing a face detection process according to the embodiment.
Figure 3:
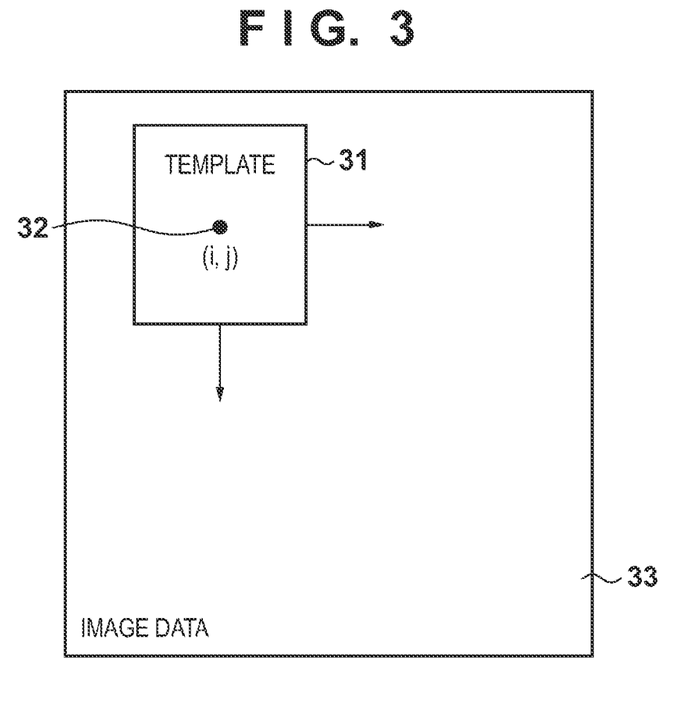
FIG. 3 is a diagram for explaining a pattern recognition process.

In FIG. 2, image data 33 shown in FIG. 3 acquired from the image storage buffer 101a is pre-processed (S11), and a pattern of a characteristic part is extracted from the pre-processed image data 33 (S12). The extracted pattern of the characteristic part is matched with a template 31 based on a standard pattern of face to perform template matching. A recognition pattern is acquired by the template matching (S13), and the acquired recognition pattern is output to the face size discrimination unit 103 (S14) to end the pattern recognition process.

An example of the template matching performed in S13 will be more specifically described with reference to FIG. 3. A center point 32 of the template 31 is first placed on a coordinate point (i, j) of the acquired image data 33. Similarity between the template 31 and the pattern of the characteristic part extracted from the image data 33 is calculated while scanning the center point 32 in the image data 33, and a position with the maximum similarity is determined. The pattern extracted from the image data 33 of the face can be matched with the template 31 including shapes of eyes, ears, etc., to acquire position information of eyes and coordinate information (face coordinates) indicating the face area.

The present invention is not limited to the face detection method described above, and any method can be used as long as the face can be detected. Examples of known face detection methods other than the method described above include a method of using learning based on a neural network, etc., and a method of extracting a characteristic region in physical shapes from the image area. A method of statistically analyzing an amount of image characteristics, such as the color of the skin of the detected face and the shape of the eyes, is also known. An example of a method examined for implementation includes a method of using wavelet conversion and an amount of image characteristics.

<About Face Size Discrimination>

The face size discrimination unit 103 counts the number of pixels in the face area from the information of the face detected by the face information detection circuit 102 and discriminates the size of the face based on the number of pixels. The face area can be indicated by, for example, coordinate information showing an area detected as the face.

Figure 4:
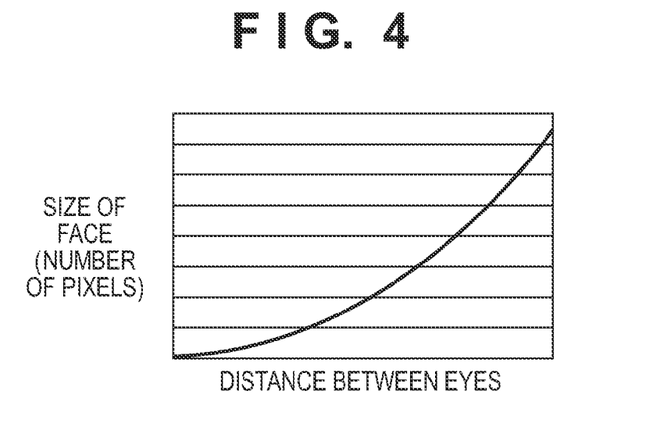
FIG. 4 is a diagram showing an example of a statistical relationship between the face size, indicated by the number of pixels in an image, and a distance between eyes according to the embodiment.

The present invention is not limited to the discrimination method of the face size described above, and any method can be used as long as the face size can be discriminated. For example, the face size discrimination unit 103 may be configured to discriminate the face size based on the position information of eyes among the face information detected by the face information detection circuit 102. For example, a distance between eyes on image data can be calculated based on the position information of eyes, and a table can be formed using a statistical relationship, obtained in advance, between the distance between eyes and the size of the face to thereby discriminate the size of the face. FIG. 4 shows an example of the statistical relationship between the face size indicated by the number of pixels in the image and the distance between eyes. Statistically, the face size can be uniquely associated with the distance between eyes in the image.

The face size may be discriminated by counting the number of pixels in the face area based on coordinate values of predetermined positions, such as four corners, of the detected face.

<About Subject Distance Estimation>

The subject distance estimation unit 104 estimates the subject distance from the camera body 100 to the subject based on the face size discriminated by the face size discrimination unit 103. More specifically, the subject distance estimation unit 104 estimates the subject distance by referencing a conversion table of the lens at a predetermined focal length created in advance from the relationship between the face size and the subject distance based on the face size discriminated by the face size discrimination unit 103.

Figure 5A:
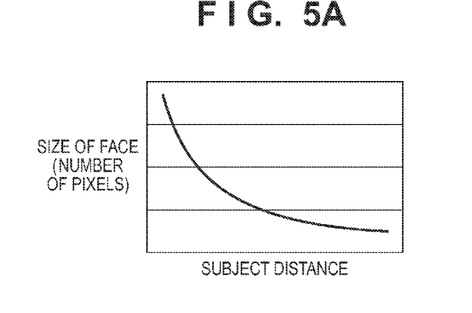
FIGS. 5A and 5B are diagrams showing examples of a relationship between the face size and the subject distance according to the embodiment.

FIG. 5A shows an example of a relationship between the face size indicated by the number of pixels on the image and the subject distance. In an example, a table based on the relationship shown in FIG. 5A is created for a wide-angle lens with a lens focal length of 38 mm, and the subject distance is estimated. If the lens focal length is not 38 mm, the discriminated face size is multiplied by (38 mm/actual lens focal length (mm)), and the value is used to reference the conversion table.

Figure 5B:
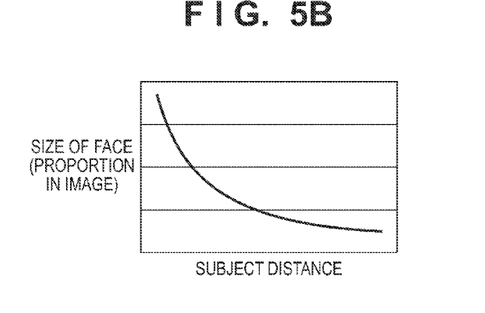

The arrangement is not limited to this. As illustrated in FIG. 5B, a table may be formed and used, in place of the face size, based on a relationship between the proportion of the detected face area in the image and the subject distance.

The subject distance varies depending on the size or the used area of the image sensor. Therefore, the conversion table for calculating the estimated subject distance may be regenerated or a plurality of conversion tables may be stored in advance in accordance with the mode.

<About Auto-Focus Scan Range>

Figure 6:
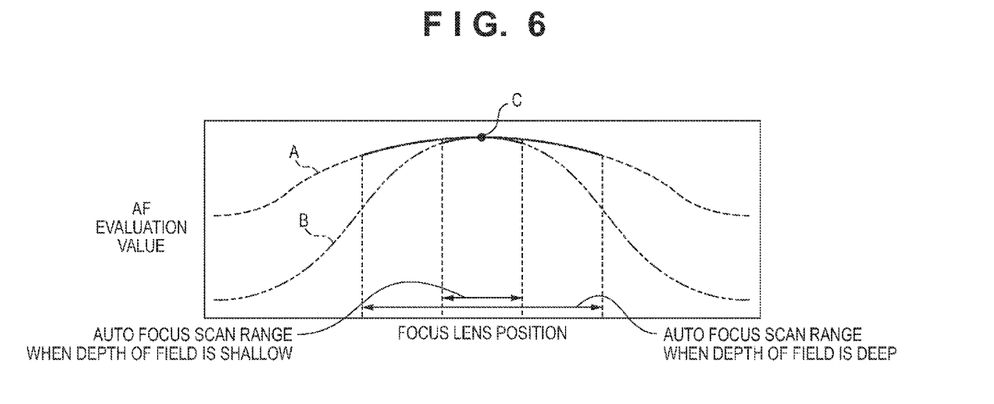
FIG. 6 is a diagram for explaining a determination method of an auto-focus scan range.

A determination method of the auto-focus scan range will be described with reference to FIG. 6. FIG. 6 is a diagram showing an example of the AF evaluation value relative to the focus lens position, in relation to different depths of field. In FIG. 6, the ordinate denotes the AF evaluation value, and the abscissa denotes the focus lens position. A curved line A denotes an example of a deep depth of field, and a curved line B denotes an example of a shallow depth of field. A position C denotes an in-focus point.

As shown in the curved line A, the variation width of the AF evaluation value is small when the depth of field is deep. Therefore, the AF evaluation value needs to be detected from a wide auto-focus scan range to find the in-focus point C.

Meanwhile, as shown in the curved line B, the variation width of the AF evaluation value is large when the depth of field is shallow. Therefore, the in-focus point C can be found by detecting the AF evaluation value in an auto-focus scan range narrower than when the depth of field is deep.

Therefore, in S110 of FIG. 9 described later, the auto-focus scan range when the detected face is determined to be the face of an actual person is set around the estimated subject distance, as a result of calculation based on Expressions (4) and (5). In this way, the auto-focus scan range can be enlarged when the depth of field is deep, and the auto-focus scan range can be narrowed down when the depth of field is shallow.

<About Imaging Process According to Present Embodiments>

Figure 7A:
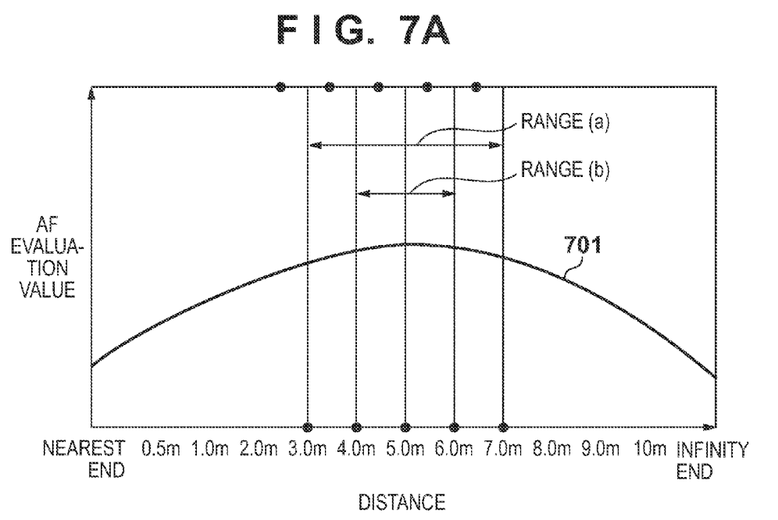
FIGS. 7A and 7B are diagrams for explaining a method of discrimination between the face of an actual person and a picture of face according to the embodiment.
Figure 7B:
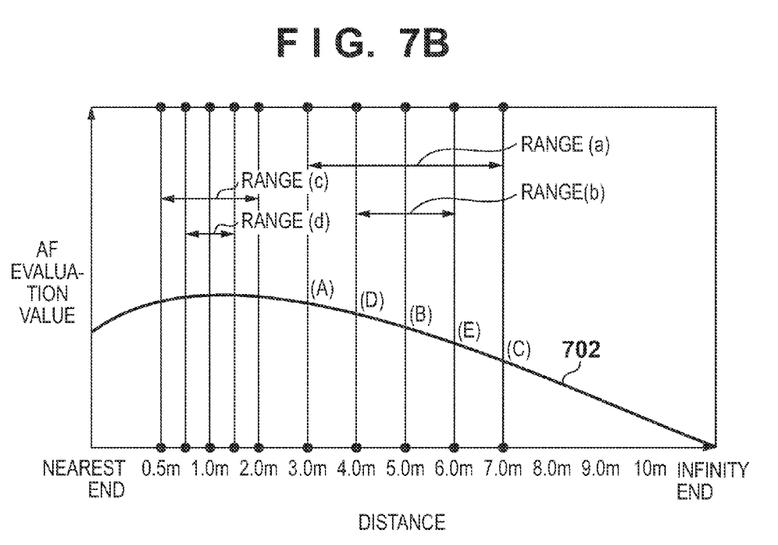

An photographing process according to the present embodiment will be schematically described with reference to FIGS. 7A to 9. In FIGS. 7A and 7B, the ordinate denotes the AF evaluation value, and the abscissa denotes the distance (hereinafter, called "lens distance") focused at the focus lens position in the lens unit 300. A focus lens position corresponding to a distance with the maximum AF evaluation value is the focus position. In FIGS. 7A and 7B, curved lines 701 and 702 show examples of the AF evaluation value at each lens distance.

FIG. 7A is a diagram showing an auto-focus scan range determined based on Expressions (4) and (5) when the subject distance estimated by the subject distance estimation unit 104 is 5.0 m. It is assumed here that the near-side position of the auto-focus scan range corresponding to an f-number (a) is 3.0 m, and the infinity-side position is 7.0 m (hereinafter, described as "range (a)"). It is also assumed that the near-side position of the auto-focus scan range corresponding to an f-number (b) is 4.0 m, and the infinity-side position is 6.0 m (hereinafter, described as "range (b)"). Usually, focusing is possible when the auto-focus scan range determined this way is scanned.

Figure 8:
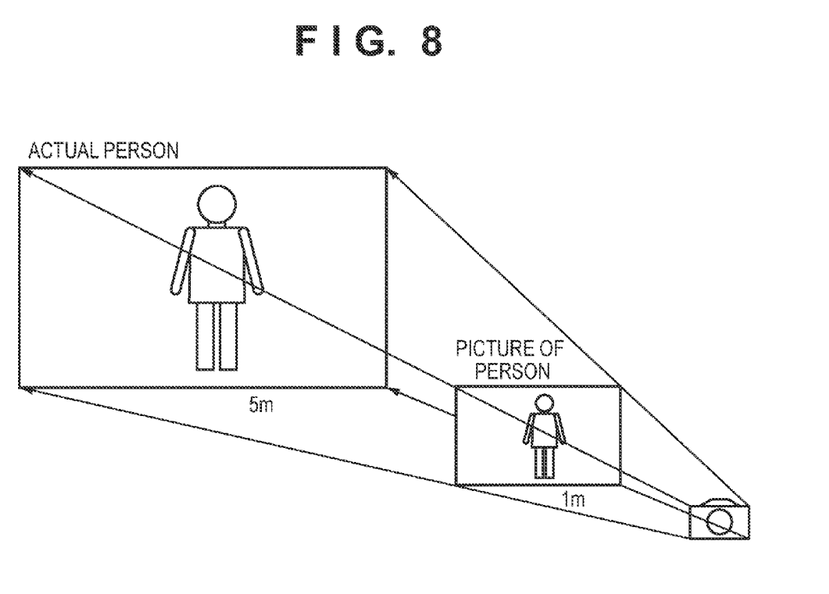
FIG. 8 is a diagram showing a relationship between the subject and the position of the camera.

It is assumed here that the estimated subject distance is not the distance to the actual person, but is a distance calculated based on the person detected from a picture when there is a picture of the person in a distance relationship as shown in FIG. 8. In the example shown in FIG. 8, the subject is falsely detected to be at a distance of 5.0 m based on the size of the detected face, although the picture is actually at a distance of 1.0 m. Therefore, the range (a) or (b) is determined as the auto-focus scan range.

Meanwhile, FIG. 7B is a diagram showing an auto-focus scan range determined based on (4) and (5) when the subject distance calculated based on the focal length, focus lens position, and the f-number acquired from the lens unit 300 is 1.0 m. It is assumed here that the near-side position of the auto-focus scan range corresponding to an f-number (c) is 0.5 m, and the infinity-side position is 2.0 m (hereinafter, described as "range (c)"). It is also assumed that the near-side position of the auto-focus scan range corresponding to an f-number (d) is 0.75 m, and the infinity-side position is 1.5 m (hereinafter, described as "range (d)"). In this case, the ranges (a) and (b) determined for the subject distance 5.0 m estimated based on the falsely detected subject are not included in the focus scan range of the subject distance 1.0 m. Therefore, the focusing is not successful when the range (a) or (b) is scanned. In such a case, the auto-focus processing is stopped after the display of a failure of focusing, or the auto-focus scan is continuously performed from 7.0 to the infinity end or from the infinity end to the nearest end to continue the movement until the focusing is successful. Therefore, much time is required.

Therefore, during the operation in a live view mode in the present embodiment, the AF control is performed after determining the focus scan range by comparing the range of the depth of field obtained based on the lens distance when the currently displayed image is photographed and the range calculated from the depth of field obtained based on the estimated subject distance and Expressions (4) and (5).

A summary of a focus control process according to the present embodiment will be described with reference to a flow chart of FIG. 9. The camera control unit 110 and/or the AF control unit 111 performs the determinations and controls in the flow chart of FIG. 9 in accordance with a predetermined program.

Figure 9:
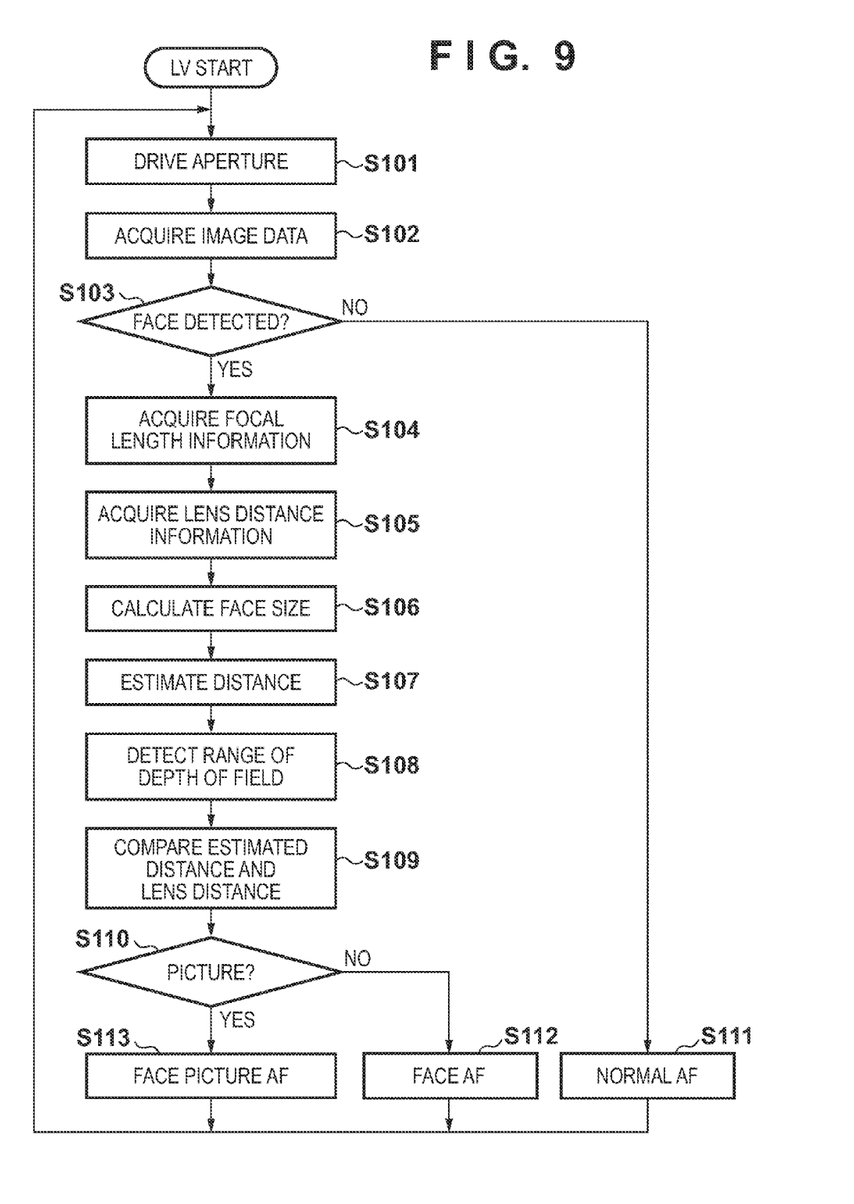
FIG. 9 is a flow chart showing a focus control process during live view according to the embodiment.

FIG. 9 is a flow chart showing a process during the live view according to the present embodiment. In the present embodiment, it is assumed that the camera body 100 is operating in the live view mode prior to the process of the flow chart of FIG. 9, the mirror 114 is raised up, and the shutter 115 is open. In the live view mode, image data based on image signals output at a predetermined interval from the image sensor 101 is sequentially displayed on the display apparatus 113 through the display circuit 112 to realize the live view.

The camera control unit 110 first calculates an f-number controlled by a manual or an AE control unit (not shown) (step S101). To avoid obstructing the display of the live view, the f-number is selected so that the frame rate of the live view is not slowed down and so that the face information detection circuit can detect the face in a wide range while controlling the amount of noise. The aperture control unit 304 is controlled based on the calculated f-number to drive the aperture 302.

Based on the light irradiated through the lens unit 300, the image data based on the image signal output from the image sensor 101 is stored in the image storage buffer 101a, and the face information detection circuit 102 acquires the image data from the image storage buffer 101a (step S102). Whether the face information detection circuit 102 has detected a face from the acquired image data is determined (step S103).

If it is determined that a face is not detected (NO in step S103), normal auto-focus control is performed based on, for example, a conventional technique (step S111).

On the other hand, if it is determined that a face is detected (YES in step S103), the AF control unit 111 acquires the focal length information of the lens unit 300 (step S104). The current position information of the focus lens (lens distance information) is further acquired (step S105). For example, the camera control unit 110 communicates with the lens system control unit 307 of the lens unit 300 through the interface 119, etc., to acquire the focal length information and the lens distance information. The acquired focal length information and lens distance information are transferred to the AF control unit 111. The lens distance information is information indicating the distance from the image capturing apparatus to the focus point corresponding to the current position of the focus lens. Obviously, only the current position of the focus lens may be acquired, and the camera body 100 may calculate the distance to the in-focus point.

The face size discrimination unit 103 calculates the face size based on the information of the face detected in step S102 (step S106), and the subject distance estimation unit 104 estimates the distance to the subject based on the obtained face size and the focal length information acquired in step S104 (step S107).

The range of the depth of field at the current focus lens position is calculated based on the focal length information acquired in step S104, the lens distance information acquired in step S105, and the aperture information acquired in step S101. The auto-focus scan range is calculated as described above with reference to FIG. 6 based on the calculated depth of field (step S108).

In step S108, the range of the depth of field is further calculated based on the subject distance estimated from the face information in step S107, the lens distance information acquired in step S105, and the aperture information acquired in step S101. The auto-focus scan range is calculated as described above with reference to FIG. 6 based on the calculated depth of field.

In the following S109, whether at least part of the auto-focus scan range calculated from the lens distance information and the auto-focus scan range calculated from the estimated subject distance overlaps is determined. As described above with reference to FIG. 7B, if two auto-focus scan ranges do not overlap at all, the detected face is determined to be a face in a picture (YES in step S110). The auto-focus scan range (range (c) or (d) in the example of FIG. 7B) calculated from the lens distance information is selected to perform auto-focus scan to execute the AF control (face picture AF) (step S113). In flash photographing, an amount of flash light of a flash not shown is set based on the lens distance information. The camera control unit 110 can determine and control the amount of flash light.

On the other hand, if at least part of the ranges overlaps, the detected face is determined to be the face of an actual person (NO in step S110). The auto-focus scan range (for example, the range (a) or (b) of FIG. 7A) calculated from the estimated subject distance is selected to perform the auto-focus scan to execute the AF control (face AF) (step S112). In flash imaging, the amount of flash light is set based on the estimated subject distance. This is because it can be considered that the current lens distance and the estimated subject distance estimated in step S107 are not significantly apart when an actual person is imaged. More specifically, it is likely that the auto-focus scan range calculated from the current lens distance information and the auto-focus scan range calculated from the estimated subject distance overlap. Therefore, the face is determined to be the face of an actual person if at least part of the auto-focus scan ranges overlaps, and the auto-focus scan is applied to the auto-focus scan range calculated from the estimated subject distance.

As described, according to the present embodiment, the auto-focus can be accurately performed even if the face of a detected person is the face in a picture instead of the face of an actual person, and the time required for the auto-focus can be reduced.

If the face is determined to be the face in a picture in flash imaging, the lens distance information is used instead of using the estimated subject distance obtained from the face detection result to take a picture with an appropriate amount of flash light.

In the description of the embodiment, the auto-focus scan range is determined based on the lens distance information when the face is determined to be the face in a picture. However, the present invention is not limited to this, and if the face is determined to be the face in a picture (YES in step S110), normal auto-focus control may be performed based on, for example, a conventional technique (step S111).

In the above embodiment, if at least part of the auto-focus scan ranges overlaps (NO in step S110), the face is determined to be the face of an actual person, and the auto-focus scan range calculated from the estimated subject distance is adopted. Alternatively, both the auto-focus scan range calculated from the estimated subject distance and the auto-focus scan range calculated from the current lens distance information may be handled as a range to be covered.

In the above embodiment, the auto-focus scan range calculated from the current lens distance information and the auto-focus scan range calculated from the estimated subject distance are compared to determine whether the face is the face of an actual person or the face in a picture in step S110. However, the face may be determined to be the face of an actual person if there is an estimated subject distance in the auto-focus scan range calculated from the current lens distance information, and the face may be determined as the face in a picture if there is no estimated subject distance.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-185578, filed on Aug. 20, 2010 which is hereby incorporated by reference herein in its entirety.

What is claimed is:

1. An image capturing apparatus that performs auto-focus control of a contrast method based on image data obtained by photoelectrically converting light from a subject entered through an imaging lens, the image capturing apparatus comprising:
   an image sensor that senses a subject at a predetermined period to acquire image data;
   a face detection unit that detects a face of a person from the image data when images based on the image data acquired by said image sensor are sequentially displayed on a display unit;
   an estimation unit that estimates a distance from said image sensor to the detected face in a real space;
   a calculation unit that obtains a first depth of field based on a focal length of the imaging lens, an f-number, and the distance estimated by said estimation unit, calculates a first scan range for driving a focus lens of the imaging lens in the auto-focus control based on the first depth of field and the distance, obtains a second depth of field based on the focal length, the f-number, and a distance in the real space to an in-focus point when the image data used to detect the face is acquired, and calculates a second scan range based on the second depth of field and the distance to the in-focus point;
   a selection unit that selects one of the first and second scan ranges calculated by said calculation unit; and
   a detection unit that detects the in-focus point based on a contrast signal acquired while driving the focus lens in the first or second scan range selected by said selection unit,
   wherein said selection unit selects the first scan range if at least part of the first and second scan ranges overlaps and does not select the first scan range if the first and second scan ranges do not overlap.

2. The image capturing apparatus according to claim 1, wherein said selection unit selects the second scan range if the first and second scan ranges do not overlap.

3. The image capturing apparatus according to claim 1, further comprising a determination unit that determines a scan range by a predetermined method if said face detection unit does not detect a face,
   wherein said determination unit determines the scan range by the predetermined method if the first and second scan ranges do not overlap.

4. The image capturing apparatus according to claim 1, further comprising a control unit that controls an amount of illumination light of a flash, wherein
   said control unit controls the amount of illumination light based on the distance estimated by said estimation unit if said selection unit selects the first scan range and controls the amount of illumination light based on a distance in the real space focused at the position of the focus lens when the displayed image is captured if the second scan range is selected.

5. A control method of an image capturing apparatus that performs auto-focus control of a contrast method based on image data obtained by photoelectrically converting light from a subject entered through an imaging lens, the control method comprising:
   an image sensing step of sensing a subject by an image sensor at a predetermined period to acquire image data;

a face detection step of detecting a face of a person from the image data when images based on the image data acquired in said image sensing step are sequentially displayed on a display unit;

an estimation step of estimating a distance from the image sensor to the detected face in a real space;

a calculation step of obtaining a first depth of field based on a focal length of the imaging lens, an f-number, and the distance estimated in said estimation step, calculating a first scan range for driving a focus lens of the imaging lens in the auto-focus control based on the first depth of field and the distance, obtaining a second depth of field based on the focal length, the f-number, and a distance in the real space to an in-focus point when the image data used to detect the face is acquired, and calculating a second scan range based on the second depth of field and the distance to the in-focus point;

a selection step of selecting one of the first and second scan ranges calculated in said calculation step; and a detection step of detecting the in-focus point based on a contrast signal acquired while driving the focus lens in the first or second scan range selected in said selection step, wherein in said selection step, the first scan range is selected if at least part of the first and second scan ranges overlaps, and the first scan range is not selected if the first and second scan ranges do not overlap.

6. A non-transitory readable storage medium having stored thereon a program which is executable by an image processing apparatus, the program having a program code for realizing the control method according to claim 5.

* * * * *